HARTMAN & SHELLER.
Grain-Drill.

No. 45,825. Patented Jan 10, 1865.

Witnesses:
W. H. Burridge
J. Holmes

Inventor:
W. H. Hartman
Samuel Sheller

UNITED STATES PATENT OFFICE.

W. H. HARTMAN AND SAMUEL SHELLER, OF FOSTORIA, OHIO.

COMBINED SEEDING-MACHINE, ROLLER, AND DRAG.

Specification forming part of Letters Patent No. 45,825, dated January 10, 1865.

*To all whom it may concern:*

Be it known that we, W. H. HARTMAN and SAMUEL SHELLER, of Fostoria, in the county of Hancock and State of Ohio, have invented certain new and useful Improvements in a Combined Seeding-Machine, Roller, and Harrow; and we do hereby declare that the following is a full and complete description of the construction and operation of the same, reference being had to the accompanying drawings, making a part of this specification, in which—

Figure 1:
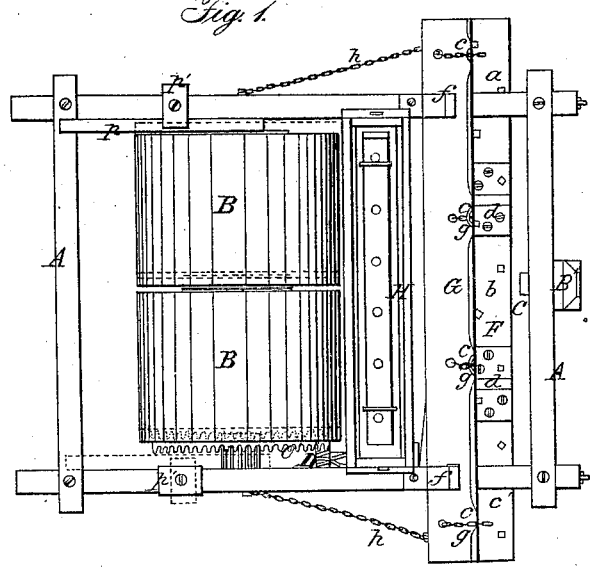
Figure 2:
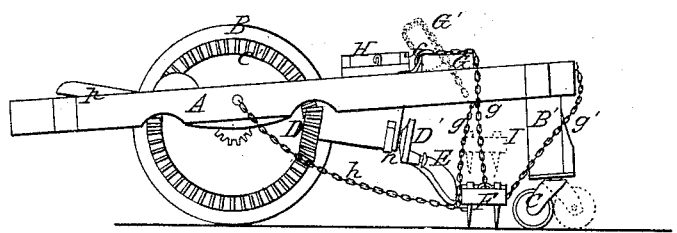
Figure 3:
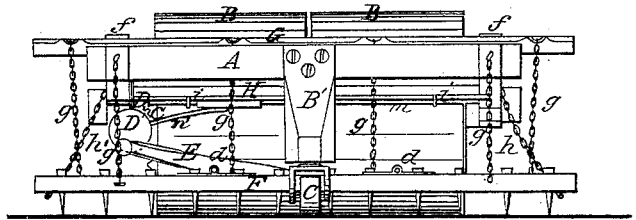

Figure 1 is a top view. Fig. 2 is a side view. Fig. 3 is an end view.

Like letters of reference indicate like parts in the several views.

My improvement relates to a combined machine so constructed and arranged that it can be used as a drag, seeding-machine, and roller collectively, or adjusted so as to be operated separately, as may be desired.

A in the several figures represents an oblong square frame, with which the different parts of the machine are connected.

B B are rollers that turn on a shaft secured in the side pieces of the frame, elevating that end of the frame, the other end being supported by a post, B′, in the center, extending down with a caster, C, underneath, as shown in Figs. 2 and 3. On the outer end of one of the rollers is secured a cog-wheel, C′, that works in a pinion, D, which operates the drag and seeding apparatus. On the end of the pinion-shaft is secured a crank-wheel, D′, which is connected by a pitman, E, to one side of the drag F, about the center, so that by the revolution of the crank-wheel a vibrating motion is given to the drag. The drag is suspended from a lever, G, on the top of the frame by chains $g$, attached to the upper side of the lever and the side and top of the drag. The upper corner edge, where the chains pass over the lever, is beveled out, as at $c$, to keep the upper ends of the chains in place. The chains $g'$, attached to the front side of the drag and the end of the frame, aid also in keeping the drag in place.

$h\ h$ are drag-chains secured to the drag and the sides of the frame, as represented.

The lever G is connected to the top of the frame by means of curved metallic straps $f$, passing through openings in the middle of the lever and secured to the top of the frame, forming a hinge-joint, by which the lever can be turned back, as indicated by the dotted lines G′ in Fig. 2, elevating the rake, as noted at I in the same figure. The rake is made up of sections $a\ b\ c'$, hinged together at $d$, by which it is rendered flexible and better adapted to the unevenness of the ground.

On the shaft of the pinion D is an eccentric, $n$, (seen in Fig. 2) that operates a slide, $m$, under the seed-box H, by means of a connecting-rod, $n'$, (Fig. 3,) moving the slide back and forth under the box, the guides $i\ i$ keeping it in place. The seed-box is supported in the frame at the ends between the rollers and lever G.

$p$ is an adjustable piece or shift, put in at either end of the rollers, slotted out at one end, so that it fits down on the shaft of the rollers, and the other end rests on the frame, as represented, a button, $p'$, keeping it in place. The rollers can be moved along either way on the shaft the width of the shift $p$, the object of which is that the cog-wheel C′ and pinion D can be held in and out of gear for the purpose of operating the sower and drag with the roller when desired, or to use the roller without the drag and sower. When the shift $p$ is at the side or between the end of the rollers and frame, as represented in Fig. 1, the cog-wheel C′ is held in gear with the pinion, and the drag and sower are operated by the rollers turning on the ground; but when it is desired to use the rollers alone, take out the shift, move the rollers along, and put it in at the other end or side, as indicated by the dotted lines in Fig. 1, when the rollers will turn without working the pinion or operating the drag and sower. The drag is lifted out of the way, as before stated, by turning up the lever C.

What we claim as our improvement, and desire to secure by Letters Patent, is—

The special arrangement of the jointed drag F, lever G, and chains $g\ h$, in combination with the seeding apparatus and adjustable rollers B B, when arranged and operating as and for the purpose set forth.

W. H. HARTMAN.
SAMUEL SHELLER.

Witnesses:
J. W. JONES,
JAMES HAYS.